US011979418B2

(12) United States Patent
Simon et al.

(10) Patent No.: US 11,979,418 B2
(45) Date of Patent: May 7, 2024

(54) DETECTING POTENTIAL MALICIOUS USE OF A RESOURCE MANAGEMENT AGENT USING A RESOURCE MANAGEMENT LOG

(71) Applicant: Microsoft Technology Licensing, LLC, Redmond, WA (US)

(72) Inventors: Johnathan Samuel Simon, Kfar Shmaryahu (IL); Ram Haim Pliskin, Rishon Lezion (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 321 days.

(21) Appl. No.: 17/341,976

(22) Filed: Jun. 8, 2021

(65) Prior Publication Data
US 2022/0394051 A1 Dec. 8, 2022

(51) Int. Cl.
*G06F 21/00* (2013.01)
*H04L 9/40* (2022.01)

(52) U.S. Cl.
CPC ........ *H04L 63/1425* (2013.01); *H04L 63/145* (2013.01)

(58) Field of Classification Search
CPC ... H04L 63/1425; H04L 63/145; H04W 84/12
See application file for complete search history.

(56) References Cited

U.S. PATENT DOCUMENTS

| | | | | |
|---|---|---|---|---|
| 6,775,780 B1* | 8/2004 | Muttik | .................... | G06F 21/53 713/165 |
| 9,619,649 B1* | 4/2017 | Yun | ......................... | G06F 21/53 |
| 2011/0219449 A1* | 9/2011 | St. Neitzel | .............. | G06F 21/53 726/23 |
| 2011/0320955 A1* | 12/2011 | O'Connor | ............. | H04L 63/104 726/4 |
| 2016/0173507 A1* | 6/2016 | Avrahami | ............. | H04L 63/145 726/23 |
| 2017/0286671 A1* | 10/2017 | Chari | .................... | G06F 21/552 |
| 2018/0351968 A1* | 12/2018 | MacLeod | ............ | H04L 63/0236 |
| 2021/0133323 A1* | 5/2021 | Shin | ....................... | G06F 21/554 |

OTHER PUBLICATIONS

Pliskin, Ram, "Azure LoLBins: Protecting Against the Dual use of Virtual Machine Extensions", Retrieved from: https://www.microsoft.com/security/blog/2021/03/09/azure-lolbins-protecting-against-the-dual-use-of-virtual-machine-extensions/, Mar. 9, 2021, 14 Pages.

* cited by examiner

*Primary Examiner* — Michael M Lee
(74) *Attorney, Agent, or Firm* — Wade IP Law PLLC

(57) ABSTRACT

Techniques are described herein that are capable of detecting potential malicious use of a resource management agent using a resource management log. The resource management log is analyzed. The resource management log logs API requests that request that a resource management system cause the resource management agent to perform respective operations. An anomalous operation is detected among the operations based at least in part on an identified API request satisfying one or more criteria associated with anomalous behavior. The identified API request requests that the resource management system cause the resource management agent, which is loaded on a machine and which enables the resource management system to remotely manage resources associated with the machine, to perform the anomalous operation. An alert is generated to notify a user of the potential malicious use of the resource management agent based at least in part on detection of the anomalous operation.

20 Claims, 5 Drawing Sheets

DETECTING POTENTIAL MALICIOUS USE OF A RESOURCE MANAGEMENT AGENT USING A RESOURCE MANAGEMENT LOG

BACKGROUND

Resource management is management of resources that are associated with a machine. For instance, the resources may include applications that execute on the machine and memory of the machine. The machine may be a physical machine (e.g., computer) or a virtual machine. A resource management system is a system that performs resource management with regard to a machine. The resource management system may install code on the machine to implement some aspects of the resource management under control of the resource management system. Such code may be referred to as a resource management agent. Security of the resource management system and/or the resource management agent may be compromised via an attack by a malicious entity.

SUMMARY

Various approaches are described herein for, among other things, detecting potential malicious use of a resource management agent using a resource management log. The resource management agent may be loaded on a machine to enable a resource management system to remotely manage resources associated with the machine. For instance, the resource management agent may be loaded on the machine by the resource management system. The resource management log may be generated by the resource management system to identify application programming interface (API) requests that are received at the resource management system. The API requests request that the resource management system cause the resource management agent to perform respective operations. By analyzing the resource management log, a resource management log analyzer may identify which of the operations are anomalous and alert a user of the potential malicious use of the resource management agent based on the identification.

In an example approach of detecting potential malicious use of a resource management agent using a resource management log, the resource management log is analyzed. The resource management log logs API requests that request that a resource management system cause the resource management agent to perform respective operations. An anomalous operation is detected among the operations based at least in part on an identified API request satisfying one or more criteria associated with anomalous behavior. The API requests include the identified API request. The identified API request requests that the resource management system cause the resource management agent, which is loaded on a machine and which enables the resource management system to remotely manage resources associated with the machine, to perform the anomalous operation. An alert is generated to notify a user of the potential malicious use of the resource management agent based on (e.g., based at least in part on) detection of the anomalous operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
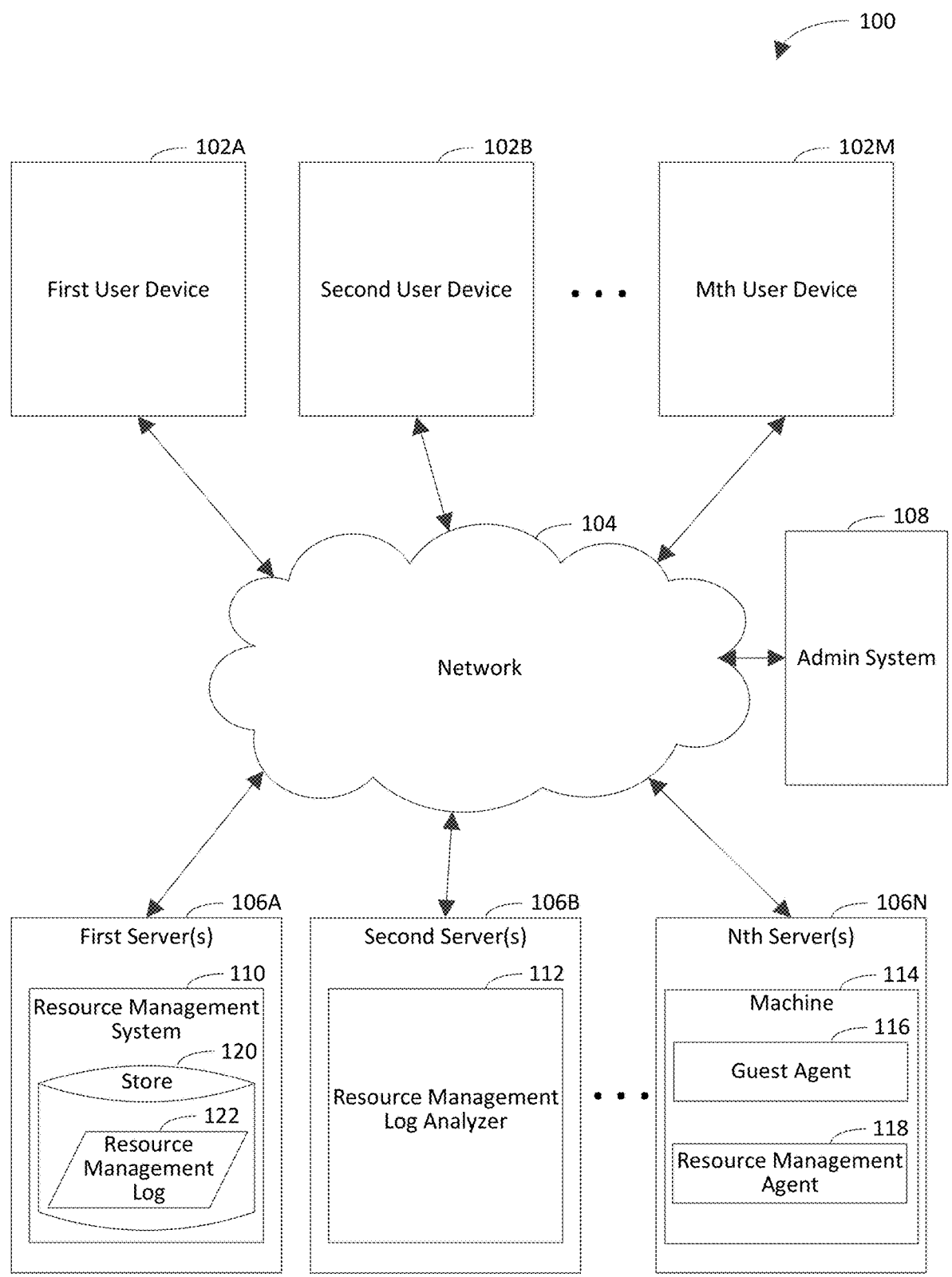
FIG. 1 is a block diagram of an example log-based malicious use detection system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of detecting potential malicious use of a resource management agent using a resource management log. The resource management agent may be loaded on a machine to enable a resource management system to remotely manage resources associated with the machine. For instance, the resource management agent may be loaded on the machine by the resource management system. The resource management log may be generated by the resource management system to identify application programming interface (API) requests that are received at the resource management system. The API requests request that the resource management system cause the resource management agent to perform respective operations. By analyzing the resource management log, a resource management log analyzer may identify which of the operations are anomalous and alert a user of the potential malicious use of the resource management agent based on the identification.

Example techniques described herein have a variety of benefits as compared to conventional techniques for detecting malicious activity. For instance, the example techniques may be capable of increasing security of a computing system (e.g., machine) on which a resource management agent runs and/or an account of a user that is controllable or accessible via the resource management agent. The example techniques may enable detection of malicious uses of a resource management agent and/or inhibit (e.g., prevent) such uses. For example, use of the resource management agent to perform malicious operations, such as installing or executing malicious code, may be inhibited (e.g., avoided). Accordingly, the example techniques may be capable of countering attack vectors that operate on top of built-in agents. The example techniques may alert a user (e.g., an information technology (IT) professional) of potential malicious uses of the resource management agent. By using the resource management log to identify anomalous operations that are indicated in API requests received at the resource management system, potential malicious uses of the resource management agent may be thwarted. Examples of an anomalous operation include but are not limited to a first use of an agent or file; a failure of an API request; a first removal of an agent or a file; a general exclusion of a file, folder, account, or subscription from triggering alerts by malware detection service; utilization of a file associated with a malicious campaign; an API request that requests the operation including known suspicious keyword(s), command(s), or uniform resource identifier(s) (URIs); an API request that requests the operation referencing (e.g., utilizing) a known suspicious binary or script; and multiple tenants accessing or downloading a same file (e.g., from a same repository). For instance, a URI may be a uniform resource name (URN) or a uniform resource locator (URL). Accordingly, the example techniques may reduce a likelihood that a malicious entity will be able to use the resource management agent to perform malicious operations.

The example techniques may utilize a guest agent associated with (e.g., built into) a cloud computing service to provide at least some of the functionality described herein, which may obviate a need to create a new guest agent (e.g., for facilitating communications between the resource management system and the resource management agent). For instance, by using a guest agent associated with a cloud computing service, overhead associated with detecting potential malicious use of a resource management agent may be reduced.

The example techniques may be capable of detecting anomalous operations indicated by API requests without a need to intercept the API requests in route to the resource management system. For instance, by using the resource management log to identify the anomalous operations, the example techniques may avoid delays that would otherwise be caused by intercepting the API requests.

The example techniques may reduce an amount of time and/or assets (e.g., processor, memory, network bandwidth) that are consumed to detect and/or respond to (e.g., remedy) malicious use of the resource management agent. For example, by using the resource management log to identify anomalous operations that are indicated in API requests received at the resource management system, an amount of time and/or assets consumed to detect and/or respond to malicious use of the resource management agent may be reduced. For instance, the example techniques may prevent malicious use of the resource management agent in which case the amount of time and/or assets consumed to respond to the malicious use may be avoided.

By inhibiting malicious uses of the resource management agent, the example techniques may improve (e.g., increase) a user experience of a user whose computing device or account is affected by the resource management agent, increase efficiency of the user, and/or reduce a cost associated with detecting and responding to malicious activity. The example techniques may be more efficient, reliable, and/or effective than conventional techniques for detecting malicious activity, for example, by detecting anomalous operations before instructions regarding the operations are sent from the resource management system toward the resource management agent. The example techniques may be capable of more accurately and/or precisely determining whether a potential malicious use of the resource management agent has been requested.

FIG. 1 is a block diagram of an example log-based malicious use detection system 100 in accordance with an embodiment. Generally speaking, the log-based malicious use detection system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the log-based malicious use detection system 100 detects potential malicious use of a resource management agent 118 using a resource management log. Detail regarding techniques for detecting potential malicious use of a resource management agent using a resource management log is provided in the following discussion.

As shown in FIG. 1, the log-based malicious use detection system 100 includes a plurality of user devices 102A-102M, a network 104, a plurality of servers 106A-106N, and an admin system 108. Communication among the user devices 102A-102M, the servers 106A-106N, and the admin system 108 is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may generate API requests, requesting that a resource management system 110 cause the resource management agent 118 to perform respective operations relating to management of one or more resources associated with a machine 114.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are processing systems that are capable of communicating with the user devices 102A-102M. The servers 106A-106N also may be capable of communicating with the admin system 108 (e.g., to provide analytics regarding the resource management system 110, the resource management log analyzer 112, the guest agent 116, and/or the resource management agent 118 to a user of the admin system 108). The servers 106A-106N are configured to execute computer programs that provide information to users in response to receiving requests from the users. For example, the information may include documents (Web pages, images, audio files, video files, etc.), output of executables, or any other suitable type of information. Any one or more of the computer programs may be a cloud computing service. A cloud computing service is a service that executes at least in part in the cloud. The cloud may be a remote cloud, an on-premises cloud, or a hybrid cloud. It will be recognized that an on-premises cloud may use remote cloud services. Examples of a cloud computing service include but are not limited to Azure® developed and distributed by Microsoft Corporation, Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., and Rackspace® developed and distributed by Rackspace US, Inc. In accordance with some example embodiments, the servers 106A-106N are configured to host respective Web sites, so that the Web sites are accessible to users of the log-based malicious use detection system 100.

The first server(s) 106A are shown to include the resource management system 110 for illustrative purposes. The resource management system 110 is configured to perform resource management with regard to the machine 114. For instance, the resource management may include mitigating (e.g., preventing) resource leaks and/or handling resource contention. A resource leak is an omission of releasing a resource in response to an application finishing use of the resource. A resource contention is a conflict created by multiple processes simultaneously attempting to access a shared resource. Examples of a resource include but are not limited to a processor (e.g., central processing unit (CPU)), memory (e.g., random access memory (RAM), read-only memory (ROM), virtual memory, cache space (e.g., CPU cache, MMU cache)), and network bandwidth.

The resource management system 110 records information regarding the API requests that are received from the user devices 102A-102M in a resource management log 122. The resource management log 122 identifies each request and the corresponding operation that the respective request seeks to have the resource management agent 118 perform. The resource management system 110 may receive each of the API requests through any suitable interface, including but not limited to a portal, a command-line interface, an API (e.g., a representational state transfer (REST) API), or a task automation and configuration management framework (e.g., PowerShell®) interface. The API requests may be received through an interface of a cloud-computing system, though the example embodiments are not limited in this respect. Each API request may be encrypted or unencrypted. For instance, each encrypted API request may be configured such that only the machine 114 (e.g., a component thereon, such as the guest agent 116 or the resource management agent 118) is capable of decrypting the encrypted API request. The resource management system 110 includes a store 120, which stores the resource management log 122.

The resource management system 110 may cause the resource management agent 114 to be installed on the machine 114. For example, the resource management system 110 may instruct a guest agent 116 that is installed on the machine 114 to install the resource management agent 118 on the machine 114. In another example, the resource management system 110 may install the resource management agent 118 on the machine 114 without utilizing the guest agent 116. The resource management system 110 may control the guest agent 116 and/or the resource management agent 118 to cause the guest agent 116 and/or the resource management agent 118 to perform at least some aspects of the resource management with regard to the machine 114. For example, upon receipt of an API request from a user device (e.g., any of user devices 102A-102M), the resource management system 110 may instruct the guest agent 116 to cause the resource management agent 118 to perform the operation that is indicated by the request. In another example, the resource management system 110 may instruct the resource management agent 118 to perform the operation without utilizing the guest agent 116.

The second server(s) 106B are shown to include a resource management log analyzer 112 for illustrative purposes. The resource management log analyzer 112 is configured to detect potential malicious use of the resource management agent 118 using the resource management log 122. To this end, the resource management log analyzer 112 analyzes the resource management log 122 to determine whether the operations that are indicated by the API requests included any anomalous operations. The resource management log analyzer 112 may determine whether an operation is an anomalous operation based on (e.g., based at least in part on) whether the API request that requests performance of the operation satisfies one or more criteria associated with anomalous behavior. Examples of a criterion that is associated with anomalous behavior include but are not limited to (1) the request including keyword(s) associated with known malicious activity, (2) the operation utilizing a file associated with known malicious activity, (3) a temporally first instance in which the resource management agent 118 is to be executed, (4) a temporally first instance in which the resource management agent 118 is to be deleted, (5) a temporally first instance in which the resource management agent 118 is to perform an operation for a designated subscription, (6) the operation creating or updating a password of an administrator account, (7) the operation setting settings of an administrator account, (8) the operation excluding a file or a type of files (e.g., .exe files) from triggering an alert (e.g., for a designated subscription) for a temporally first time within a designated period of time (e.g., the last four weeks, 30 days, or 45 days), (9) the operation excluding a binary from triggering an alert, (10) the operation disabling a runtime of a malware detection system, (11), the request being included among multiple requests from multiple tenants to perform a common (i.e., same) operation, (12) the operation running a script for longer than a threshold duration of time, and (13) the request indicating that the operation is to be performed outside specified time period(s).

In an example embodiment, the resource management log analyzer 112 detects an anomalous operation among the operations that are indicated by the API requests based at least in part on an identified API request, which is included among the API requests, satisfying one or more criteria associated with anomalous behavior. The identified API request requests that the resource management system 110 cause the resource management agent 118 to perform the anomalous operation. For example, the identified request may request that the resource management system 110 instruct the guest agent 116 to cause the resource management agent 118 to perform the anomalous operation. In another example, the identified request may request that the resource management system 110 instruct the resource management agent 118 to perform the anomalous operation. In accordance with this embodiment, the resource management log analyzer 112 generates an alert to notify a user (e.g., a user of the admin system 108) of the potential malicious use of the resource management agent 118 based on detection of the anomalous operation.

The resource management log analyzer 112 may use machine learning to perform at least some of its operations. For instance, the resource management log analyzer 112 may use the machine learning to develop and refine the criteria used by the resource management log analyzer 112 to determine whether a requested operation is anomalous. The resource management log analyzer 112 may use the machine learning to analyze API requests to determine whether the operations identified therein are anomalous (e.g., are likely to be anomalous) and/or to determine whether operations that are identified as being anomalous result in (e.g., are likely to result in) malicious use of the resource management agent 118.

The resource management log analyzer 112 may use a neural network to perform the machine learning to predict how common a requested operation is and/or how likely an anomalous operation is to result in malicious use of the resource management agent 118. Examples of a neural network include but are not limited to a feed forward neural network and a long short-term memory (LSTM) neural network. A feed forward neural network is an artificial neural network for which connections between units in the neural network do not form a cycle. The feed forward neural network allows data to flow forward (e.g., from the input nodes toward the output nodes), but the feed forward neural network does not allow data to flow backward (e.g., from the output nodes toward the input nodes). In an example embodiment, the resource management log analyzer 112 employs a feed forward neural network to train a machine learning model that is used to determine ML-based confidences. Such ML-based confidences may be used to determine likelihoods that events will occur.

An LSTM neural network is a recurrent neural network that has memory and allows data to flow forward and backward in the neural network. The LSTM neural network is capable of remembering values for short time periods or long time periods. Accordingly, the LSTM neural network may keep stored values from being iteratively diluted over time. In one example, the LSTM neural network may be capable of storing information, such as historical instances of anomalous operations and likelihoods of such anomalous operations to result in malicious use of the resource management agent 118 over time. For instance, the LSTM neural network may generate an anomalous operations model and/or a malicious behavior model by utilizing such information. In another example, the LSTM neural network may be capable of remembering relationships between features, such as users, subscriptions, API requests, requested operations, detected anomalous operations, criteria regarding anomalous behavior, identified malicious uses of the resource management agent 118, and ML-based confidences that are derived therefrom.

The resource management log analyzer 112 may include training logic and inference logic. The training logic is configured to train a machine learning algorithm that the inference logic uses to determine (e.g., infer) the ML-based confidences. For instance, the training logic may provide sample users, sample subscriptions, sample API requests, sample operations, sample anomalous operations, sample criteria regarding anomalous behavior, sample malicious uses of the resource management agent 118, and sample confidences as inputs to the algorithm to train the algorithm. The sample data may be labeled. The machine learning algorithm may be configured to derive relationships between the features (e.g., users, subscriptions, API requests, requested operations, detected anomalous operations, criteria regarding anomalous behavior, and identified malicious uses of the resource management agent 118) and the resulting ML-based confidences. The inference logic is configured to utilize the machine learning algorithm, which is trained by the training logic, to determine the ML-based confidence when the features are provided as inputs to the algorithm.

The resource management log analyzer 112 may be implemented in various ways to detect potential malicious use of the resource management agent 118 using the resource management log 122, including being implemented in hardware, software, firmware, or any combination thereof. For example, the resource management log analyzer 112 may be implemented as computer program code configured to be executed in one or more processors. In another example, at least a portion of the resource management log analyzer 112 may be implemented as hardware logic/electrical circuitry. For instance, at least a portion of the resource management log analyzer 112 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

The Nth server(s) 106N are shown to include the machine 114 for illustrative purposes. The machine 114 may be a physical machine (e.g., a computer) or a virtual machine. It should be noted that the machine 114 may not have access to the resource management log 122. For instance, the resource management log 122 may be isolated from the machine 114. The machine 114 hosts the guest agent 116 and the resource management agent 118. The guest agent 116 is configured to cause (e.g., instruct) the resource management agent 118 to perform operations relating to management of resources associated with the machine 114 based on instructions that are received from the resource management system 110. For instance, the guest agent 116 may be triggered to cause the resource management agent 118 to perform an operation as a result of receiving an instruction from the resource management system 110 that instructs the guest agent 116 to do so. For example, the guest agent 116 may install an intermediary agent, which corresponds to the resource management agent 118, to cause the resource management agent 118 to perform the operation. The guest agent 116 may launch (e.g., install) the resource management agent 118, report status of the resource management agent 118, update the resource management agent 118, remove the resource management agent 118, and so on. The guest agent may perform such operations with regard to any suitable number (e.g., 2, 3, 4, or 5) of resource management agents. For instance, although a single resource management agent 118 is shown in FIG. 1 for illustrative purposes, it will be recognized that the log-based malicious use detection system 100 may include multiple resource management agents, each of which may be capable of performing the operations described below with respect to the resource management agent 118.

The resource management agent 118 enables the resource management system 110 to remotely manage resources associated with the machine 114. The resource management agent 118 is configured to perform operations relating to management of the resources based on instructions that are received from the guest agent 116 and/or the resource management system 110. For example, the resource management agent 118 may be an application that provides post-deployment configuration and automation tasks on the machine 114. In another example, the resource management agent 118 may be a pre-installed Windows® or Linux™ binary tool.

Examples of a resource management agent include but are not limited to a custom script extension, a virtual machine access extension, and an antimalware extension. A custom script extension enables a user to cause scripts to be executed on a machine (e.g., machine 114). For instance, an API request from the user may specify a script that is to be executed, and the resource management agent 118 may download the specified script from a store. The store may be internal to the resource management system 110 (e.g., store 120) or external to the resource management system (e.g., GitHub® store). A virtual machine access extension enables a user to create or update passwords of administrator accounts and/or reset settings (e.g., privileges) of existing administrator accounts. The virtual machine access extension also may enable a user to create and/or reset secure shell protocol (SSH) public keys. SSH is a cryptographic network protocol that establishes a manner in which network services (e.g., remote command-line login, remote command execution) are to be securely performed over an unsecure network. An antimalware extension enables a user to remotely exclude applications from a malware detection service (e.g., from real-time protection provided by the service), disable the real-time protection, and/or change configuration of a scheduler that schedules sessions during which anti-malware operations are performed by the malware detection service.

The admin system 108 is a processing system that is capable of communicating with the servers 106A-106N. The admin system 108 is configured to perform administrative functions with regard to the resource management system 110. For instance, the admin system 108 may establish criteria for identifying resource leaks, resource contentions, anomalous operations, and so on. The admin system 108 may provide the criteria for identifying resource leaks and resource contentions to the resource management system 110. The admin system 108 may provide the criteria for identifying anomalous operations to the resource management log analyzer 112. The admin system 108 may be configured to receive alerts, indicating that potential malicious use of the resource management agent 118 has occurred or is likely to occur, from the resource management log analyzer 112. The admin system 108 may be configured to automatically perform actions to mitigate a negative effect of the malicious use, to stop the malicious use, to identify a malicious entity that maliciously used the resource management agent 118, and/or to inhibit (e.g., prevent) the malicious entity from maliciously using the resource management agent 118 in the future (e.g., suspending or terminating a subscription and/or account of the malicious entity).

The resource management system 110 is shown to be incorporated in the first server(s) 106A for illustrative purposes and is not intended to be limiting. It will be recognized that the resource management system 110 (or any portion(s) thereof) may be incorporated in any one or more of the servers 106A-106N.

The resource management log analyzer 112 is shown to be incorporated in the second server(s) 106B for illustrative purposes and is not intended to be limiting. It will be recognized that the resource management log analyzer 112 (or any portion(s) thereof) may be incorporated in any one or more of the user devices 102A-102M. For example, client-side aspects of the resource management log analyzer 112 may be incorporated in one or more of the user devices 102A-102M, and server-side aspects of the resource management log analyzer 112 may be incorporated in the second server(s) 106B. In another example, the resource management log analyzer 112 may be distributed among the user devices 102A-102M. In yet another example, the resource management log analyzer 112 may be incorporated in a single one of the user devices 102A-102M. In another example, the resource management log analyzer 112 may be distributed among the server(s) 106A-106N. In still another example, the resource management log analyzer 112 may be incorporated in a single one of the servers 106A-106N.

The machine 114, including the guest agent 116 and the resource management agent 118, is shown to be incorporated in the Nth server(s) 106N for illustrative purposes and is not intended to be limiting. It will be recognized that the machine 114 (or any portion(s) thereof) may be incorporated in any one or more of the user devices 102A-102M and/or any one or more of the servers 106A-106N.

Figure 2:
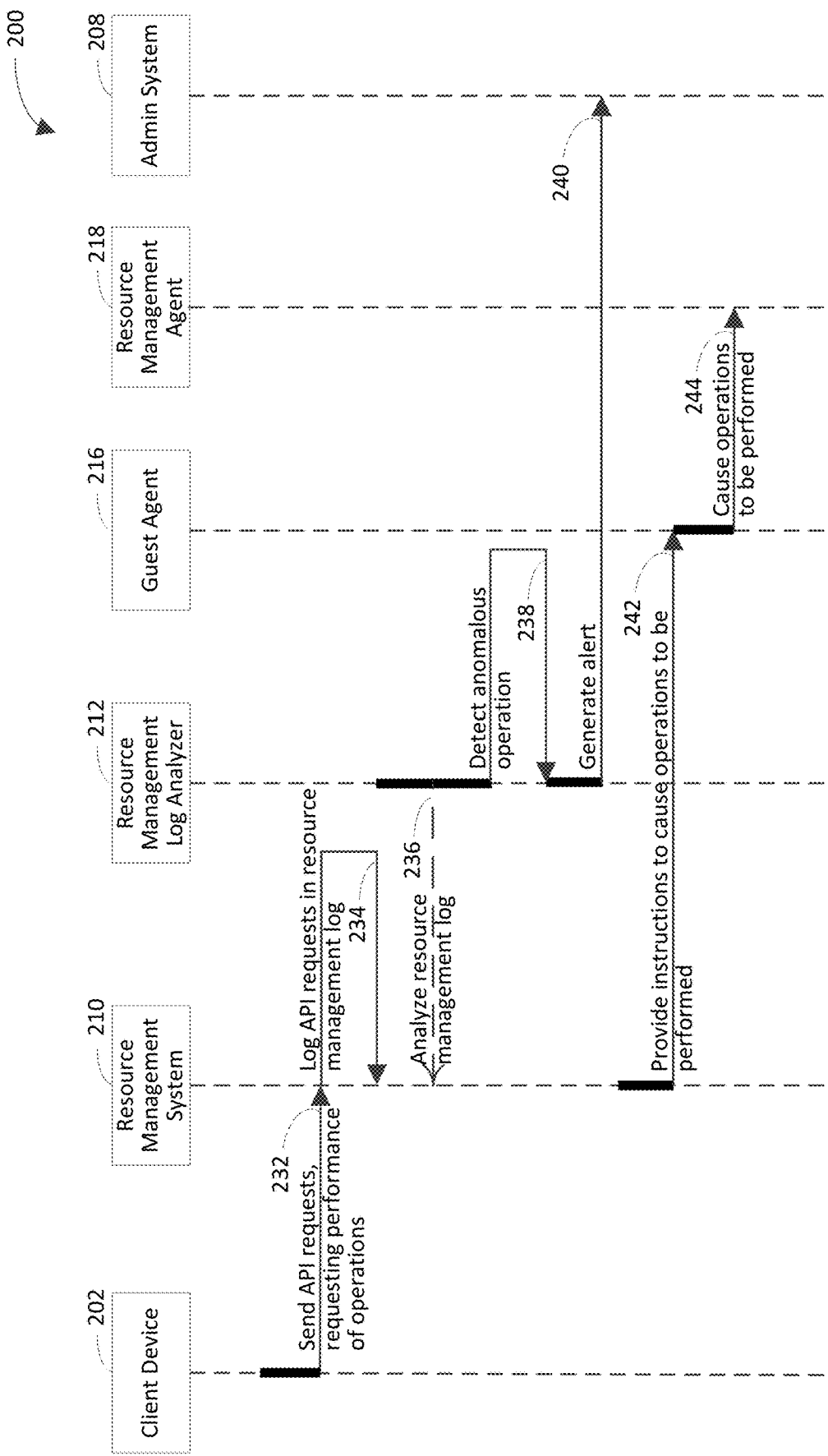
FIG. 2 is an example activity diagram for detecting potential malicious use of a resource management agent using a resource management log in accordance with an embodiment.

FIG. 2 is an example activity diagram 200 for detecting potential malicious use of a resource management agent using a resource management log in accordance with an embodiment. FIG. 2 depicts a client device 202, a resource management system 210, a resource management log analyzer 212, a guest agent 216, a resource management agent 218, and an admin system 208, which are example implementations of a client device 102, a resource management system 110, a resource management log analyzer 112, a guest agent 116, a resource management agent 118, and an admin system 108 shown in FIG. 1. Activities 232, 234, 236, 238, 240, 242, and 244 will now be described with reference to the client device 202, the resource management system 210, the resource management log analyzer 212, the guest agent 216, the resource management agent 218, and the admin system 208.

In activity 232, the client device 202 send API requests, which request performance of respective operations, to the resource management system 210.

In activity 234, the resource management system 210 logs the API requests, which are received from the client device 202, in a resource management log.

In activity 236, the resource management log analyzer 212 analyzes the resource management log.

In activity 238, the resource management log analyzer 212 detects an anomalous operation among the operations that are requested in the API requests.

In activity 240, the resource management log analyzer 212 generates an alert to indicate that the anomalous operation has been detected. The resource management log analyzer 212 sends the alert to the admin system 208 to notify a user of the admin system 208 of a potential malicious use of the resource management agent 218 based on the anomalous operation being detected.

In activity 242, the resource management system 210 provides instructions to the guest agent 216, instructing the guest agent to cause the operations, which are requested in the API requests, to be performed.

In activity 244 the guest agent 216 causes the operations to be performed. For instance, the guest agent 216 may provide instructions to the resource management agent 218, instructing the resource management agent 218 to perform the operations.

In some example embodiments, one or more activities 232, 234, 236, 238, 240, 242, and/or 244 of activity diagram 200 may not be performed. For instance, the resource management log analyzer 212 may perform remedial operations based on detection of the anomalous operation in activity 238 to prevent the resource management system 210 from providing the instructions to the guest agent 216 in activity 242 and/or to prevent the guest agent 216 from causing the operations to be performed in activity 244. Moreover, activities in addition to or in lieu of activities 232, 234, 236, 238, 240, 242, and/or 244 may be performed. It will be recognized that some activities may be combined and/or performed in parallel.

Figure 3:
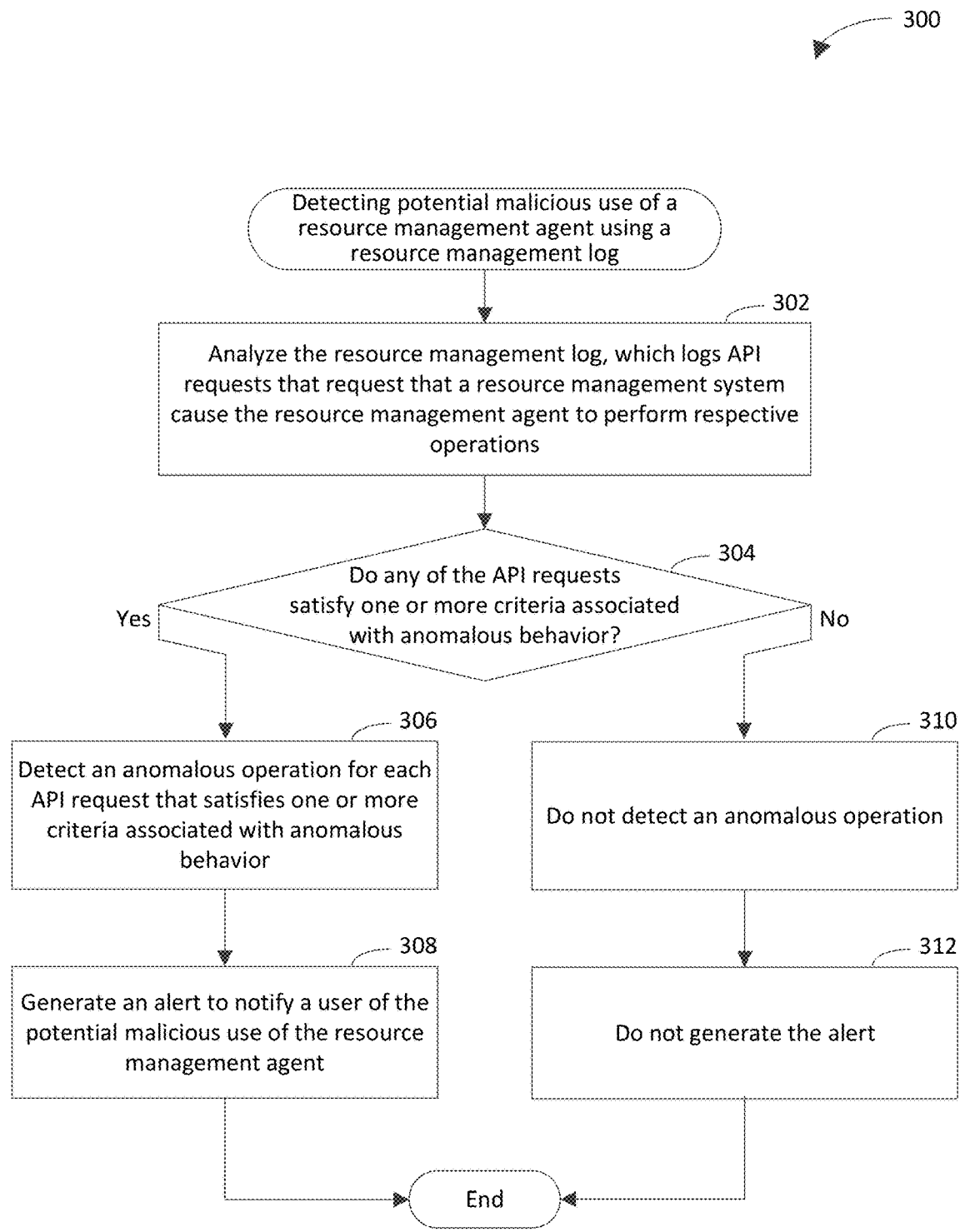
FIG. 3 depicts a flowchart of an example method for detecting potential malicious use of a resource management agent using a resource management log in accordance with an embodiment.
Figure 4:
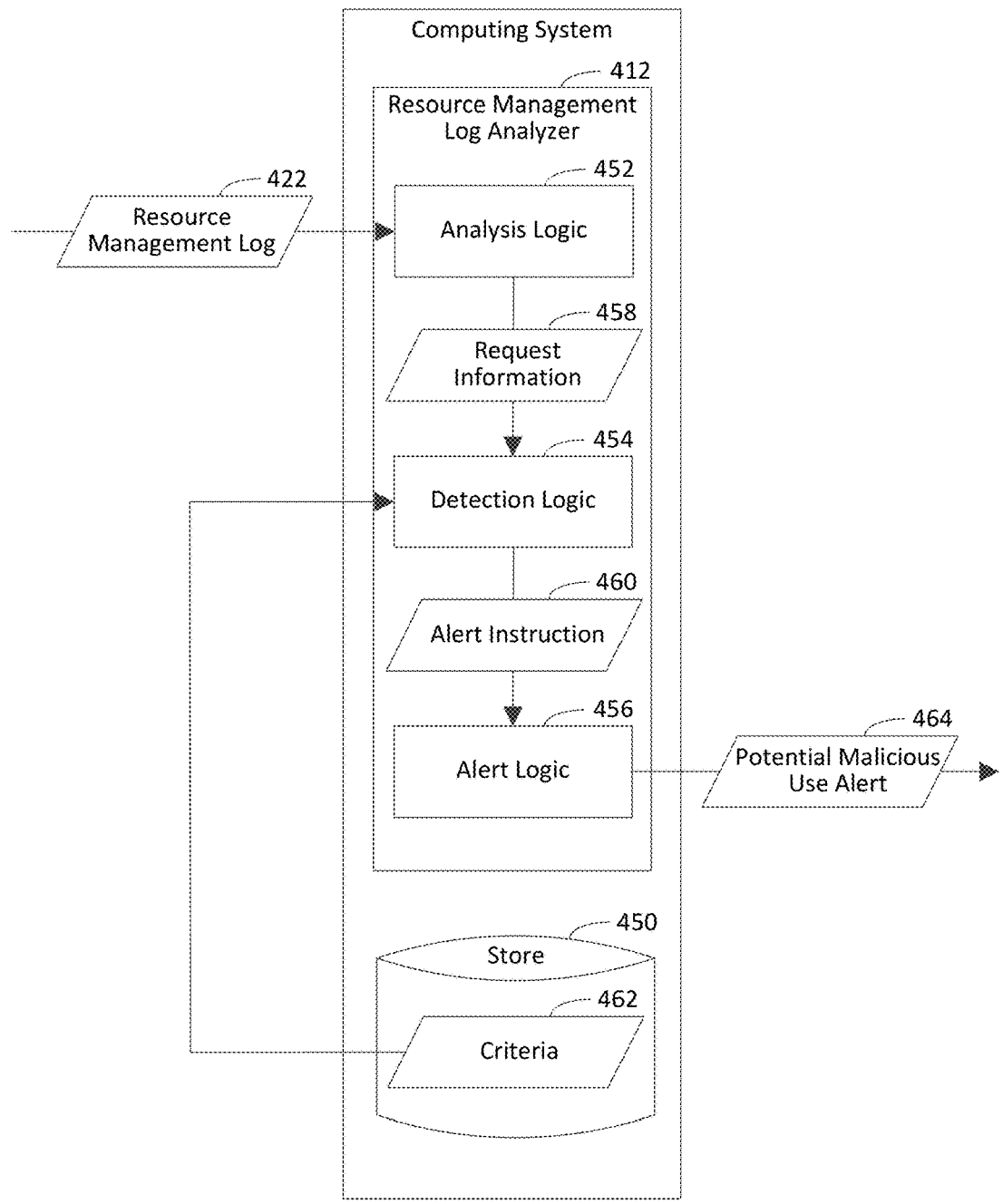
FIG. 4 is a block diagram of an example computing system in accordance with an embodiment.

FIG. 3 depicts a flowchart 300 of an example method for detecting potential malicious use of a resource management agent using a resource management log in accordance with an embodiment. Flowchart 300 may be performed by the second server(s) 106B, shown in FIG. 1, for example. For illustrative purposes, flowchart 300 is described with respect to computing system 400 shown in FIG. 4, which is an example implementation of the second server(s) 106B. As shown in FIG. 4, the computing system 400 includes resource management log analyzer 412 and a store 450. The resource management log analyzer 412 includes analysis logic 452, detection logic 454, and alert logic 456. The store 45 may be any suitable type of store. One type of store is a database. For instance, the store 450 may be a relational database, an entity-relationship database, an object database, an object relational database, an extensible markup language (XML) database, etc. The store 450 is shown to store criteria 462 for non-limiting illustrative purposes. Further structural and operational embodiments will be apparent to persons skilled in the relevant art(s) based on the discussion regarding flowchart 300.

As shown in FIG. 3, the method of flowchart 300 begins at step 302. In step 302, the resource management log is analyzed. The resource management log logs API requests that request that a resource management system cause the resource management agent, which is loaded on a machine and enables the resource management system to remotely manage resources associated with the machine, to perform respective operations. For instance, the resource management agent may enable the resource management system to remotely manage the resources using the resource management agent (e.g., by controlling the resource management agent to perform operations with regard to (e.g., on) the resources. In an example implementation, the analysis logic 452 analyzes a resource management log 422, which logs the API requests. The analysis logic 452 may generate request information 458, which identifies each API request and which describes (e.g., characterizes) the operation that is requested by the respective API request. For instance, the request information 458 may cross-reference each API request with a description of the operation that is requested by the respective API request.

At step 304, a determination is made whether any of the API requests satisfy one or more criteria associated with anomalous behavior. If any of the API requests satisfy one or more criteria associated with anomalous behavior, flow continues to step 306. Otherwise, flow continues to step 310. In an example implementation, the detection logic 454 determines whether any of the API requests satisfy one or more criteria associated with anomalous behavior. For instance, the detection logic 454 may compare the description of the operation that is requested by each API request, as specified in the request information 458, to the criteria 462, which are associated with anomalous behavior, to determine whether the description corresponds to (e.g., matches, is same as) one or more of the criteria 462.

In an example embodiment, the one or more criteria are predetermined, meaning that the one or more criteria are established prior to receipt of the API requests.

In another example embodiment, at least one API request is deemed to satisfy one or more criteria associated with anomalous behavior based on the operation that is identified in the respective API request having a likelihood of being performed that is less than or equal to a likelihood threshold. For instance, the likelihood of the operation being performed may be determined based on historical request information in the resource management log. In an example implementation, the analysis logic 452 may derive the historical request information from the resource management log 422. In accordance with this implementation, the analysis logic 452 may generate the request information 458 to include the historical request information. In further accordance with this implementation, the detection logic 454 may analyze the historical request information, which is included in the request information 458, to determine a number of times that each operation has been identified in an API request and/or a frequency with which API requests have identified each operation. In further accordance with this implementation, the detection logic 454 may determine that at least one of the API requests satisfies one or more criteria associated with anomalous behavior based on the number of times that the corresponding operation has historically been identified in an API request being less than or equal to a threshold and/or based on the frequency with which API requests have identified the corresponding operation being less than or equal to a frequency threshold.

At step 306, an anomalous operation is detected for each API request that satisfies one or more criteria associated with anomalous behavior. In an example implementation, the detection logic 454 detects an anomalous operation for each API request that satisfies one or more of the criteria 462. The detection logic 454 may detect each anomalous operation based on the API request that requests the anomalous operation satisfying one or more of the criteria 462. The detection logic 454 may generate an alert instruction 460, which instructs the alert logic 456 to generate a potential malicious use alert 464, as a result of the detection logic 454 detecting at least one anomalous operation. The alert instruction 460 may identify each API request that satisfies one or more of the criteria 462, indicate which of the criteria 462 the respective API request satisfies, indicate the anomalous behavior that corresponds to each of the criteria 462 that the respective API request satisfies, and so on.

In an example embodiment, detecting an anomalous operation for each API request that satisfies one or more criteria associated with anomalous behavior at step 306 includes detecting an identified anomalous operation among the operations based at least in part on an identified API request satisfying one or more criteria associated with anomalous behavior. In accordance with this embodiment, the API requests include the identified API request. In further accordance with this embodiment, the identified API request requests that the resource management system cause the resource management agent to perform the identified anomalous operation. In a guest agent implementation, the resource management log logs the API requests, which request that the resource management system instruct a guest agent to cause the resource management agent to perform the respective operations. In accordance with this implementation, the identified API request requests that the resource management system instruct the guest agent, which is loaded on the machine and which is configured to execute the resource management agent, to cause the resource management agent to perform the identified anomalous operation. Accordingly, it will be recognized that the resource management system may cause the resource management agent to perform an operation (e.g., the identified anomalous operation) by instructing the guest agent to cause the resource management agent to perform the operation. The guest agent may be configured to run a script that downloads the resource management agent to the machine, though the example embodiments are not limited in this respect.

In an aspect of this embodiment, detecting the identified anomalous operation may be performed before the resource management system causes the resource management agent to perform the identified anomalous operation.

In another aspect of this embodiment, detecting the identified anomalous operation may be based at least in part on the identified API request including one or more specified keywords that are associated with known malicious activity. In accordance with this aspect, detecting the identified anomalous operation may be further based at least in part on the identified API request not resulting in the resource management agent being used to perform the identified anomalous operation.

In yet another aspect of this embodiment, detecting the identified anomalous operation may be based at least in part on the identified API request requesting that the resource management system cause the resource management agent to perform an operation using a file that is associated with known malicious activity. For instance, detecting the identified anomalous operation may be based at least in part on the identified API request requesting that the resource management system cause the resource management agent to execute a known malicious binary script.

In still another aspect of this embodiment, detecting the identified anomalous operation may be based at least in part on the identified API request requesting that the resource management system cause the resource management agent to be executed for a temporally first time within a designated period of time. For instance, the designated period of time may be four weeks, 30 days, 45 days, or 60 days. The designated period of time may end at a time instance at which the identified API request is identified in the resource management log. For example, if the designated period of time is 40 days, the designated period of time may begin 40 days prior to the identified API request being identified in the resource management log and end when the identified API request is identified in the resource management log.

In another aspect of this embodiment, detecting the identified anomalous operation may be based at least in part on the identified API request requesting that the resource management system cause the resource management agent to be deleted for a temporally first time within a designated period of time.

In yet another aspect of this embodiment, detecting the identified anomalous operation may be based at least in part on the identified API request requesting, for a temporally first time within a designated period of time by a machine associated with a designated subscription, that the resource management system cause the resource management agent to perform an operation.

In still another aspect of this embodiment, detecting the identified anomalous operation may be based at least in part on the identified API request requesting that the resource management system cause the resource management agent to create or update a password of an administrator account associated with the machine.

In another aspect of this embodiment, detecting the identified anomalous operation may be based at least in part on the identified API request requesting that the resource management system cause the resource management agent to set settings of an administrator account associated with the machine.

In yet another aspect of this embodiment, detecting the identified anomalous operation may be based at least in part on the identified API request requesting that the resource management system cause the resource management agent to exclude a file or a type of file from triggering an alert in a subscription by a malware detection service for a temporally first time within a designated period of time.

In still another aspect of this embodiment, detecting the identified anomalous operation may be based at least in part on the identified API request requesting that the resource management system cause the resource management agent to exclude a binary from triggering an alert by a malware detection service. For instance, the binary may be associated with a known malicious (e.g., malware) campaign. In accordance with this aspect, detecting the identified anomalous operation may be based at least in part on the identified API request requesting that the resource management system cause the resource management agent to exclude binaries that are run from a designated folder from triggering an alert by a malware detection service.

In another aspect of this embodiment, detecting the identified anomalous operation may be based at least in part on the identified API request requesting that the resource management system cause the resource management agent to disable a runtime of a malware detection service (e.g., for a duration of time that is greater than or equal to a duration threshold). In accordance with this aspect, detecting the identified anomalous operation may be further based at least in part on the identified API request requesting that the resource management system cause the resource management agent to run a binary while the runtime is disabled.

In yet another aspect of this embodiment, detecting the identified anomalous operation may be based at least in part on the identified API request being included among a plurality of API requests that are from a plurality of respective tenants and that request that the resource management system cause the resource management agent to perform a common (i.e., same) operation. For example, the common operation may include accessing or downloading a common file (e.g., a common binary). In another example, the common operation may include accessing or downloading any of a variety of files (or a common file) from a common folder, a common repository, or a common storage account. In accordance with this aspect, detecting the identified anomalous operation may be further based at least in part on a number of tenants included among the plurality of tenants being greater than or equal to a threshold. In further accordance with this aspect, detecting the identified anomalous operation may be further based at least in part on the plurality of API requests being received within a specified period of time (e.g., a one-hour window, a two-hour window, or a 24-hour period).

In still another aspect of this embodiment, detecting the identified anomalous operation may be based at least in part on the identified API request requesting that the resource management system cause the resource management agent to run a script (e.g., a crypto mining script that is configured to mine cryptocurrency) for a duration of time that is greater than or equal to a threshold duration of time. For instance, the threshold duration of time may be 60 seconds or 90 seconds.

In another aspect of this embodiment, detecting the identified anomalous operation may be based at least in part on the identified API request requesting that the resource management system cause the resource management agent to perform the identified anomalous operation at a time that is not included in a reference range of times. For example, the reference range of times may be a range of times during which the identified anomalous operation historically is performed. In another example, the reference range of times may be the hours of operation of a business (e.g., from 9:00 am until 5:00 pm or from 8:00 am until 6:00 pm).

At step 308, an alert is generated to notify a user of the potential malicious use of the resource management agent. Upon completion of step 308, flowchart 300 ends. In an example implementation, the alert logic 456 generates the potential malicious use alert 464 to notify the user of the potential malicious use of the resource management agent. For instance, the alert logic 456 may generate the potential malicious use alert 464 based on receipt of the alert instruction 460.

At step 310, an anomalous operation is not detected. In an example implementation, the detection logic 454 does not detect an anomalous operation because none of the API requests satisfy one or more of the criteria 462. In accordance with this implementation, the detection logic 454 does not generate the alert instruction 460, and therefore does not instruct the alert logic 456 to generate the potential malicious use alert 464, as a result of the detection logic 454 not detecting at least one anomalous operation.

At step 312, the alert is not generated. Upon completion of step 312, flowchart 300 ends. In an example implementation, the alert logic 456 does not generate the potential malicious use alert 464. For instance, the alert logic 456 may not generate the potential malicious use alert 464 based on the alert logic 456 not receiving the alert instruction 460 from the detection logic 454.

In some example embodiments, one or more steps 302, 304, 306, 308, 310, and/or 312 of flowchart 300 may not be performed. Moreover, steps in addition to or in lieu of steps 302, 304, 306, 308, 310, and/or 312 may be performed.

It will be recognized that the computing system 400 may not include one or more of the resource management log analyzer 412, the store 450, the analysis logic 452, the detection logic 454, and/or the alert logic 456. Furthermore, the computing system 400 may include components in addition to or in lieu of the resource management log analyzer 412, the store 450, the analysis logic 452, the detection logic 454, and/or the alert logic 456.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the resource management system 110, the resource management log analyzer 112, the guest agent 116, the resource management agent 118, the resource management system 210, the resource management log analyzer 212, the guest agent 216, the resource management agent 218, the resource management log analyzer 412, the analysis logic 452, the detection logic 454, the alert logic 456, activity diagram 200, and/or flowchart 300 may be implemented in hardware, software, firmware, or any combination thereof.

For example, any one or more of the resource management system 110, the resource management log analyzer 112, the guest agent 116, the resource management agent 118, the resource management system 210, the resource management log analyzer 212, the guest agent 216, the resource management agent 218, the resource management log analyzer 412, the analysis logic 452, the detection logic 454, the alert logic 456, activity diagram 200, and/or flowchart 300 may be implemented, at least in part, as computer program code configured to be executed in one or more processors.

In another example, any one or more of the resource management system 110, the resource management log analyzer 112, the guest agent 116, the resource management agent 118, the resource management system 210, the resource management log analyzer 212, the guest agent 216, the resource management agent 218, the resource management log analyzer 412, the analysis logic 452, the detection logic 454, the alert logic 456, activity diagram 200, and/or flowchart 300 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 5:
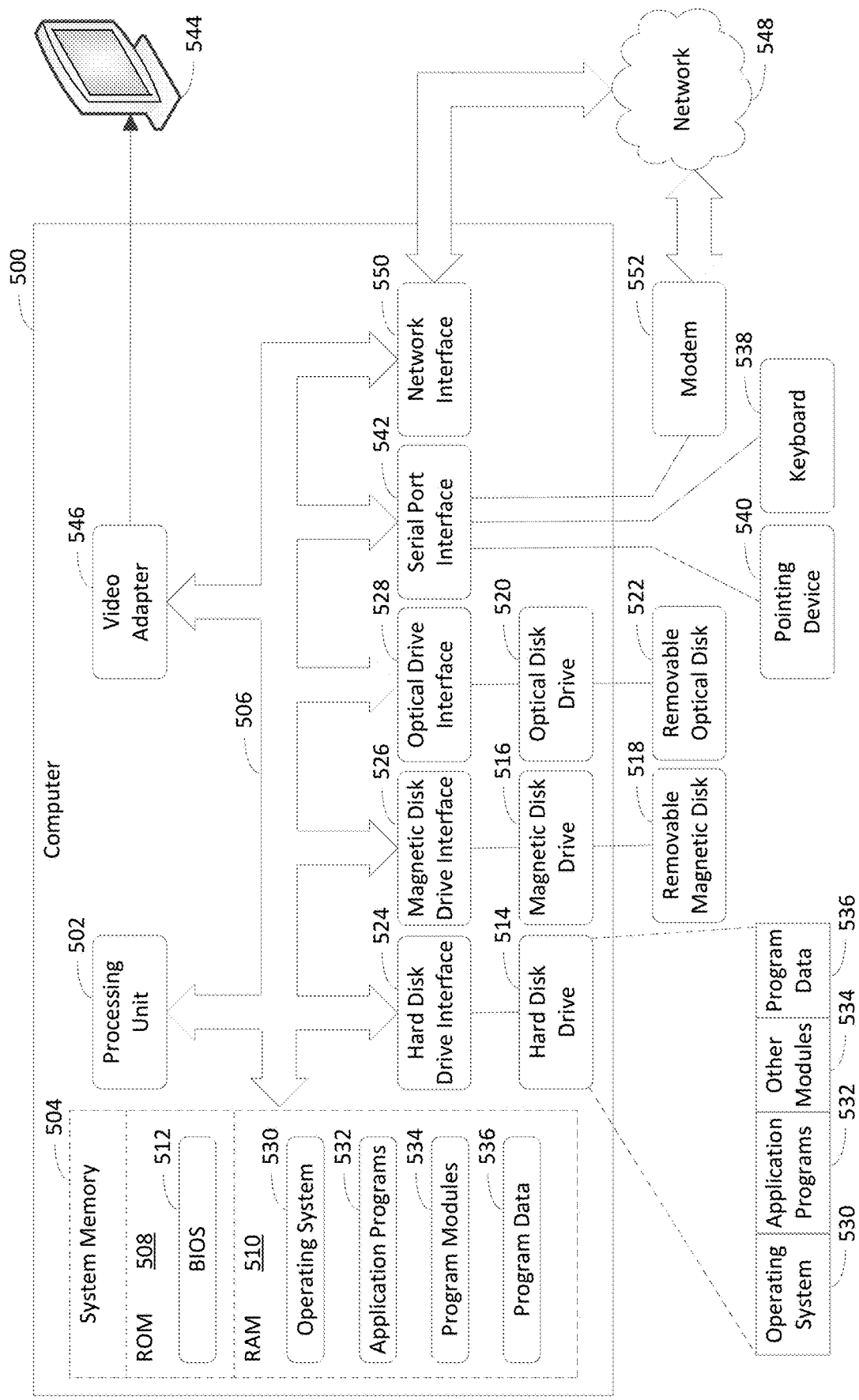
FIG. 5 depicts an example computer in which embodiments may be implemented.

III. Further Discussion of Some Example Embodiments (A1) An example system (FIG. 1, 106B; FIG. 4, 400; FIG. 5, 500) to detect potential malicious use of a resource management agent (FIG. 1, 118; FIG. 2, 218) using a resource management log (FIG. 1, 122; FIG. 4, 422) comprises a memory (FIG. 5, 504, 508, 510) and one or more processors (FIG. 5, 502) coupled to the memory. The one or more processors are configured to analyze (FIG. 2, 236; FIG. 3, 302) the resource management log, which logs application programming interface (API) requests that request that a resource management system (FIG. 1, 110; FIG. 2, 210) cause the resource management agent to perform respective operations. The one or more processors are further configured to detect (FIG. 2, 238; FIG. 3, 306) an anomalous operation among the operations based at least in part on an identified API request satisfying one or more criteria (FIG. 4, 462) associated with anomalous behavior. The API requests include the identified API request. The identified API request requests that the resource management system cause the resource management agent, which is loaded on a machine (FIG. 1, 114) and which enables the resource management system to remotely manage resources associated with the machine, to perform the anomalous operation. The one or more processors are further configured to generate (FIG. 2, 240; FIG. 3, 308) an alert (FIG. 4, 464) to notify a user of the potential malicious use of the resource management agent based on detection of the anomalous operation.

(A2) In the example system of A1, wherein the resource management log logs the API requests, which request that the resource management system instruct a guest agent to cause the resource management agent to perform the respective operations; and wherein the identified API request requests that the resource management system instruct the guest agent, which is loaded on the machine and which is configured to execute the resource management agent, to cause the resource management agent to perform the anomalous operation.

(A3) In the example system of any of A1-A2, wherein the one or more processors are configured to detect the anomalous operation before the resource management system causes the resource management agent to perform the anomalous operation.

(A4) In the example system of any of A1-A3, wherein the one or more processors are configured to detect the anomalous operation based at least in part on the identified API request including one or more specified keywords that are associated with known malicious activity.

(A5) In the example system of any of A1-A4, wherein the one or more processors are configured to detect the anomalous operation based at least in part on the identified API request requesting that the resource management system cause the resource management agent to perform an operation using a file that is associated with known malicious activity.

(A6) In the example system of any of A1-A5, wherein the one or more processors are configured to detect the anomalous operation based at least in part on the identified API request requesting that the resource management system cause the resource management agent to be executed for a temporally first time within a designated period of time.

(A7) In the example system of any of A1-A6, wherein the one or more processors are configured to detect the anomalous operation based at least in part on the identified API request requesting that the resource management system cause the resource management agent to be deleted for a temporally first time within a designated period of time.

(A8) In the example system of any of A1-A7, wherein the one or more processors are configured to detect the anomalous operation based at least in part on the identified API request requesting, for a temporally first time within a designated period of time by a machine associated with a designated subscription, that the resource management system cause the resource management agent to perform an operation.

(A9) In the example system of any of A1-A8, wherein the one or more processors are configured to detect the anomalous operation based at least in part on the identified API request requesting that the resource management system cause the resource management agent to create or update a password of an administrator account associated with the machine.

(A10) In the example system of any of A1-A9, wherein the one or more processors are configured to detect the anomalous operation based at least in part on the identified API request requesting that the resource management system cause the resource management agent to set settings of an administrator account associated with the machine.

(A11) In the example system of any of A1-A10, wherein the one or more processors are configured to detect the anomalous operation based at least in part on the identified API request requesting that the resource management system cause the resource management agent to exclude a file or a type of file from triggering an alert in a subscription by a malware detection service for a temporally first time within a designated period of time.

(A12) In the example system of any of A1-A11, wherein the one or more processors are configured to detect the anomalous operation based at least in part on the identified API request requesting that the resource management system cause the resource management agent to exclude a binary from triggering an alert by a malware detection service.

(A13) In the example system of any of A1-A12, wherein the one or more processors are configured to detect the anomalous operation based at least in part on the identified API request requesting that the resource management system cause the resource management agent to disable a runtime of a malware detection service.

(A14) In the example system of any of A1-A13, wherein the one or more processors are configured to detect the anomalous operation based at least in part on the identified API request being included among a plurality of API requests that are from a plurality of respective tenants and that request that the resource management system cause the resource management agent to perform a common operation.

(A15) In the example system of any of A1-A14, wherein the one or more processors are configured to detect the anomalous operation based at least in part on the identified API request requesting that the resource management system cause the resource management agent to run a script for a duration of time that is greater than or equal to a threshold duration of time.

(A16) In the example system of any of A1-A15, wherein the one or more processors are configured to detect the anomalous operation based at least in part on the identified API request requesting that the resource management system cause the resource management agent to perform the anomalous operation at a time that is not included in a reference range of times.

(B1) An example method of detecting potential malicious use of a resource management agent (FIG. 1, 118; FIG. 2, 218) using a resource management log (FIG. 1, 122; FIG. 4, 422), the method implemented by a computing system (FIG. 1, 106B; FIG. 4, 400; FIG. 5, 500), comprises analyzing (FIG. 2, 236; FIG. 3, 302) the resource management log, which logs application programming interface (API) requests that request that a resource management system (FIG. 1, 110; FIG. 2, 210) cause the resource management agent to perform respective operations. The method further comprises detecting (FIG. 2, 238; FIG. 3, 306) an anomalous operation among the operations based at least in part on an identified API request satisfying one or more criteria (FIG. 4, 462) associated with anomalous behavior. The API requests include the identified API request. The identified API request requests that the resource management system cause the resource management agent, which is loaded on a machine (FIG. 1, 114) and which enables the resource management system to remotely manage resources associated with the machine, to perform the anomalous operation. The method further comprises generating (FIG. 2, 240; FIG. 3, 308) an alert (FIG. 4, 464) to notify a user of the potential malicious use of the resource management agent based on detection of the anomalous operation.

(B2) In the method of B1, wherein the resource management log logs the API requests, which request that the resource management system instruct a guest agent to cause the resource management agent to perform the respective operations; and wherein the identified API request requests that the resource management system instruct the guest agent, which is loaded on the machine and which is configured to execute the resource management agent, to cause the resource management agent to perform the anomalous operation.

(B3) In the method of any of B1-B2, wherein detecting the anomalous operation comprises: detecting the anomalous operation before the resource management system causes the resource management agent to perform the anomalous operation.

(B4) In the method of any of B1-B3, wherein detecting the anomalous operation comprises: detecting the anomalous operation based at least in part on the identified API request including one or more specified keywords that are associated with known malicious activity.

(B5) In the method of any of B1-B4, wherein detecting the anomalous operation comprises: detecting the anomalous operation based at least in part on the identified API request requesting that the resource management system cause the resource management agent to perform an operation using a file that is associated with known malicious activity.

(B6) In the method of any of B1-B5, wherein detecting the anomalous operation comprises: detecting the anomalous operation based at least in part on the identified API request requesting that the resource management system cause the resource management agent to be executed for a temporally first time within a designated period of time.

(B7) In the method of any of B1-B6, wherein detecting the anomalous operation comprises: detecting the anomalous operation based at least in part on the identified API request requesting that the resource management system cause the resource management agent to be deleted for a temporally first time within a designated period of time.

(B8) In the method of any of B1-B7, wherein detecting the anomalous operation comprises: detecting the anomalous operation based at least in part on the identified API request requesting, for a temporally first time within a designated period of time by a machine associated with a designated subscription, that the resource management system cause the resource management agent to perform an operation.

(B9) In the method of any of B1-B8, wherein detecting the anomalous operation comprises: detecting the anomalous operation based at least in part on the identified API request requesting that the resource management system cause the resource management agent to create or update a password of an administrator account associated with the machine.

(B10) In the method of any of B1-B9, wherein detecting the anomalous operation comprises: detecting the anomalous operation based at least in part on the identified API request requesting that the resource management system cause the resource management agent to set settings of an administrator account associated with the machine.

(B11) In the method of any of B1-B10, wherein detecting the anomalous operation comprises: detecting the anomalous operation based at least in part on the identified API request requesting that the resource management system cause the resource management agent to exclude a file or a type of file from triggering an alert in a subscription by a malware detection service for a temporally first time within a designated period of time.

(B12) In the method of any of B1-B11, wherein detecting the anomalous operation comprises: detecting the anomalous operation based at least in part on the identified API request requesting that the resource management system cause the resource management agent to exclude a binary from triggering an alert by a malware detection service.

(B13) In the method of any of B1-B12, wherein detecting the anomalous operation comprises: detecting the anomalous operation based at least in part on the identified API request requesting that the resource management system cause the resource management agent to disable a runtime of a malware detection service.

(B14) In the method of any of B1-B13, wherein detecting the anomalous operation comprises: detecting the anomalous operation based at least in part on the identified API request being included among a plurality of API requests that are from a plurality of respective tenants and that request that the resource management system cause the resource management agent to perform a common operation.

(B15) In the method of any of B1-B14, wherein detecting the anomalous operation comprises: detecting the anomalous operation based at least in part on the identified API request requesting that the resource management system cause the resource management agent to run a script for a duration of time that is greater than or equal to a threshold duration of time.

(B16) In the method of any of B1-B15, wherein detecting the anomalous operation comprises: detecting the anomalous operation based at least in part on the identified API request requesting that the resource management system cause the resource management agent to perform the anomalous operation at a time that is not included in a reference range of times.

(C1) A first example computer program product (FIG. 5, 518, 522) comprising a computer-readable storage medium having instructions recorded thereon for enabling a processor-based system (FIG. 1, 106B; FIG. 4, 400; FIG. 5, 500) to detect potential malicious use of a resource management agent (FIG. 1, 118; FIG. 2, 218) using a resource management log (FIG. 1, 122; FIG. 4, 422) by performing operations, the operations comprising: analyzing (FIG. 2, 236; FIG. 3, 302) the resource management log, which logs application programming interface (API) requests that request that a resource management system (FIG. 1, 110; FIG. 2, 210) cause the resource management agent to perform respective operations; detecting (FIG. 2, 238; FIG. 3, 306) an anomalous operation among the operations based at least in part on an identified API request satisfying one or more criteria (FIG. 4, 462) associated with anomalous behavior, the API requests including the identified API request, the identified API request requesting that the resource management system cause the resource management agent, which is loaded on a machine (FIG. 1, 114) and which enables the resource management system to remotely manage resources associated with the machine, to perform the anomalous operation; and generating (FIG. 2, 240; FIG. 3, 308) an alert (FIG. 4, 464) to notify a user of the potential malicious use of the resource management agent based on detection of the anomalous operation.

(D1) A second example computer program product (FIG. 5, 518, 522) comprising a computer-readable storage medium having instructions recorded thereon for enabling a processor-based system (FIG. 1, 106B; FIG. 4, 400; FIG. 5, 500) to detect potential malicious use of a resource management agent (FIG. 1, 118; FIG. 2, 218) using a resource management log (FIG. 1, 122; FIG. 4, 422) by performing operations, the operations comprising: analyzing (FIG. 2, 236; FIG. 3, 302) the resource management log, which logs application programming interface (API) requests that request that a resource management system (FIG. 1, 110; FIG. 2, 210) instruct a guest agent (FIG. 1, 116; FIG. 2, 216) to cause respective operations to be performed using the resource management agent; detecting (FIG. 2, 238; FIG. 3, 306) an anomalous operation among the operations based at least in part on an identified API request satisfying one or more criteria (FIG. 4, 462) associated with anomalous behavior, the API requests including the identified API request, the identified API request requesting that the resource management system instruct the guest agent, which is loaded on a machine (FIG. 1, 114) and which is configured to execute the resource management agent, to cause the anomalous operation to be performed using the resource management agent, which is loaded on the machine and which enables the resource management system to remotely manage resources associated with the machine; and generating (FIG. 2, 240; FIG. 3, 308) an alert (FIG. 4, 464) to notify a user of the potential malicious use of the resource management agent based on detection of the anomalous operation.

IV. Example Computer System

FIG. 5 depicts an example computer 500 in which embodiments may be implemented. Any one or more of the user devices 102A-102M, any one or more of the servers 106A-106N, and/or the admin system 108 shown in FIG. 1; the client device 202 and/or the admin system 208 shown in FIG. 2; and/or the computing system 400 shown in FIG. 4 may be implemented using computer 500, including one or more features of computer 500 and/or alternative features. Computer 500 may be a general-purpose computing device in the form of a conventional personal computer, a mobile computer, or a workstation, for example, or computer 500 may be a special purpose computing device. The description of computer 500 provided herein is provided for purposes of illustration, and is not intended to be limiting. Embodiments may be implemented in further types of computer systems, as would be known to persons skilled in the relevant art(s).

As shown in FIG. 5, computer 500 includes a processing unit 502, a system memory 504, and a bus 506 that couples various system components including system memory 504 to processing unit 502. Bus 506 represents one or more of any of several types of bus structures, including a memory bus or memory controller, a peripheral bus, an accelerated graphics port, and a processor or local bus using any of a variety of bus architectures. System memory 504 includes read only memory (ROM) 508 and random access memory (RAM) 510. A basic input/output system 512 (BIOS) is stored in ROM 508.

Computer 500 also has one or more of the following drives: a hard disk drive 514 for reading from and writing to a hard disk, a magnetic disk drive 516 for reading from or writing to a removable magnetic disk 518, and an optical disk drive 520 for reading from or writing to a removable optical disk 522 such as a CD ROM, DVD ROM, or other optical media. Hard disk drive 514, magnetic disk drive 516, and optical disk drive 520 are connected to bus 506 by a hard disk drive interface 524, a magnetic disk drive interface 526, and an optical drive interface 528, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 530, one or more application programs 532, other program modules 534, and program data 536. Application programs 532 or program modules 534 may include, for example, computer program logic for implementing any one or more of (e.g., at least a portion of) the resource management system 110, the resource management log analyzer 112, the guest agent 116, the resource management agent 118, the resource management system 210, the resource management log analyzer 212, the guest agent 216, the resource management agent 218, the resource management log analyzer 412, the analysis logic 452, the detection logic 454, the alert logic 456, activity diagram 200 (including any activity of activity diagram 200), and/or flowchart 300 (including any step of flowchart 300), as described herein.

A user may enter commands and information into the computer 500 through input devices such as keyboard 538 and pointing device 540. Other input devices (not shown) may include a microphone, joystick, game pad, satellite dish, scanner, touch screen, camera, accelerometer, gyroscope, or the like. These and other input devices are often connected to the processing unit 502 through a serial port interface 542 that is coupled to bus 506, but may be connected by other interfaces, such as a parallel port, game port, or a universal serial bus (USB).

A display device 544 (e.g., a monitor) is also connected to bus 506 via an interface, such as a video adapter 546. In addition to display device 544, computer 500 may include other peripheral output devices (not shown) such as speakers and printers.

Computer 500 is connected to a network 548 (e.g., the Internet) through a network interface or adapter 550, a modem 552, or other means for establishing communications over the network. Modem 552, which may be internal or external, is connected to bus 506 via serial port interface 542.

As used herein, the terms "computer program medium" and "computer-readable storage medium" are used to generally refer to media (e.g., non-transitory media) such as the hard disk associated with hard disk drive 514, removable magnetic disk 518, removable optical disk 522, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 532 and other program modules 534) may be stored on the hard disk, magnetic disk, optical disk, ROM, or RAM. Such computer programs may also be received via network interface 550 or serial port interface 542. Such computer programs, when executed or loaded by an application, enable computer 500 to implement features of embodiments discussed herein. Accordingly, such computer programs represent controllers of the computer 500.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to detect potential malicious use of a resource management agent using a resource management log, the system comprising:
  a memory; and
  a processing unit coupled to the memory, the processing unit configured to:
    analyze the resource management log, which logs application programming interface (API) requests that request that a resource management system cause the resource management agent to perform operations;
    detect an anomalous operation among the operations based at least in part on an identified API request satisfying a criterion associated with anomalous behavior,
    the API requests including the identified API request,
    the identified API request requesting that the resource management system cause the resource management agent, which is loaded on a machine and which enables the resource management system to remotely manage resources associated with the machine, to perform the anomalous operation,
    wherein the identified API request satisfies the criterion based at least on at least one of the following:
      the identified API request requesting that the resource management system cause the resource management agent to be executed for a temporally first time within a designated period of time or deleted for a temporally first time within the designated period of time;
      the identified API request requesting, for a temporally first time within the designated period of time by a designated machine associated with a designated subscription, that the resource management system cause the resource management agent to perform an operation;
      the identified API request requesting that the resource management system cause the resource management agent to set settings of an administrator account associated with the machine;
      the identified API request requesting that the resource management system cause the resource management agent to exclude a file or a type of file from triggering an alert in a subscription by a malware detection service for a temporally first time within the designated period of time;
      the identified API request requesting that the resource management system cause the resource management agent to disable a runtime of the malware detection service;
      the identified API request requesting that the resource management system cause the resource management agent to run a script for a duration of time that is greater than or equal to a threshold duration of time; or
      the identified API request requesting that the resource management system cause the resource management agent to perform the anomalous operation at a time that is not included in a reference range of times; and
generate an alert to notify a user of the potential malicious use of the resource management agent based on detection of the anomalous operation.

2. The system of claim 1, wherein the processing unit is configured to:
detect the anomalous operation based at least in part on the identified API request requesting that the resource management system cause the resource management agent to be executed for a temporally first time within the designated period of time or deleted for a temporally first time within the designated period of time.

3. The system of claim 1, wherein the processing unit is configured to:
detect the anomalous operation based at least in part on the identified API request requesting, for a temporally first time within the designated period of time by the designated machine associated with the designated subscription, that the resource management system cause the resource management agent to perform the operation.

4. The system of claim 1, wherein the processing unit is configured to:
detect the anomalous operation based at least in part on the identified API request requesting that the resource management system cause the resource management agent to set settings of the administrator account associated with the machine.

5. The system of claim 1, wherein the processing unit is configured to:
detect the anomalous operation based at least in part on the identified API request requesting that the resource management system cause the resource management agent to exclude the file or the type of file from triggering the alert in the subscription by the malware detection service for a temporally first time within the designated period of time.

6. The system of claim 1, wherein the processing unit is configured to:
detect the anomalous operation based at least in part on the identified API request requesting that the resource management system cause the resource management agent to disable the runtime of the malware detection service.

7. The system of claim 1, wherein the processing unit is configured to:
detect the anomalous operation based at least in part on the identified API request requesting that the resource management system cause the resource management agent to run the script for the duration of time that is greater than or equal to the threshold duration of time.

8. The system of claim 1, wherein the processing unit is configured to:
detect the anomalous operation based at least in part on the identified API request requesting that the resource management system cause the resource management agent to perform the anomalous operation at the time that is not included in the reference range of times.

9. A method of detecting potential malicious use of a resource management agent using a resource management log, the method implemented by a computing system, the method comprising:
analyzing the resource management log, which logs application programming interface (API) requests that request that a resource management system cause the resource management agent to perform operations;
detecting an anomalous operation among the operations based at least in part on an identified API request satisfying a criterion associated with anomalous behavior,
the API requests including the identified API request,
the identified API request requesting that the resource management system cause the resource management agent, which is loaded on a machine and which enables the resource management system to remotely manage resources associated with the machine, to perform the anomalous operation,
wherein the identified API request satisfies the criterion based at least on at least one of the following:
the identified API request requesting that the resource management system cause the resource management agent to be executed for a temporally first time within a designated period of time;
the identified API request requesting that the resource management system cause the resource management agent to be deleted for a temporally first time within the designated period of time;
the identified API request requesting that the resource management system cause the resource management agent to create or update a password of an administrator account associated with the machine;
the identified API request requesting that the resource management system cause the resource management agent to exclude a binary from triggering an alert by a malware detection service; or
the anomalous operation based at least in part on the identified API request being included among a plurality of API requests that are from a plurality of respective tenants and that request that the resource management system cause the resource management agent to perform a common operation; and
generating an alert to notify a user of the potential malicious use of the resource management agent based on detection of the anomalous operation.

10. The method of claim 9, wherein the anomalous operation is detected before the resource management system causes the resource management agent to perform the anomalous operation.

11. The method of claim 9, wherein the anomalous operation is detected based at least in part on the identified API request requesting that the resource management system cause the resource management agent to be executed for a temporally first time within the designated period of time.

12. The method of claim 9, wherein the anomalous operation is detected based at least in part on the identified API request requesting that the resource management system cause the resource management agent to be deleted fora temporally first time within the designated period of time.

13. The method of claim 9, wherein the anomalous operation is detected based at least in part on the identified API request requesting that the resource management system cause the resource management agent to create or update the password of the administrator account associated with the machine.

14. The method of claim 9, wherein the anomalous operation is detected based at least in part on the identified API request requesting that the resource management system cause the resource management agent to exclude the binary from triggering the alert by the malware detection service.

15. The method of claim 9, wherein the anomalous operation is detected based at least in part on the identified API request being included among the plurality of API requests that are from the plurality of respective tenants and that request that the resource management system cause the resource management agent to perform the common operation.

16. A computer program product comprising a computer-readable storage medium having instructions recorded thereon for enabling a processor-based system to detect potential malicious use of a resource management agent using a resource management log by performing operations, the operations comprising:

analyzing the resource management log, which logs application programming interface (API) requests that request that a resource management system instruct a guest agent to cause operations to be performed using the resource management agent;

detecting an anomalous operation among the operations based at least in part on an identified API request satisfying a criterion associated with anomalous behavior, the API requests including the identified API request, the identified API request requesting that the resource management system instruct the guest agent, which is loaded on a machine and which is configured to execute the resource management agent, to cause the anomalous operation to be performed using the resource management agent, which is loaded on the machine and which enables the resource management system to remotely manage resources associated with the machine, wherein the identified API request satisfies the criterion based at least on at least one of the following:

the identified API request requesting that the resource management system cause the resource management agent to be executed for a temporally first time within a designated period of time or deleted for a temporally first time within the designated period of time;

the identified API request requesting, for a temporally first time within the designated period of time by a designated machine associated with a designated subscription, that the resource management system cause the resource management agent to perform an operation;

the identified API request requesting that the resource management system cause the resource management agent to set settings of an administrator account associated with the machine;

the identified API request requesting that the resource management system cause the resource management agent to exclude a file or a type of file from triggering an alert in a subscription by a malware detection service for a temporally first time within the designated period of time;

the identified API request requesting that the resource management system cause the resource management agent to disable a runtime of the malware detection service;

the identified API request requesting that the resource management system cause the resource management agent to run a script for a duration of time that is greater than or equal to a threshold duration of time;

the identified API request requesting that the resource management system cause the resource management agent to perform the anomalous operation at a time that is not included in a reference range of times;

the identified API request requesting that the resource management system cause the resource management agent to create or update a password of the administrator account associated with the machine; or the identified API request being included among a plurality of API requests that are from a plurality of respective tenants and that request that the resource management system cause the resource management agent to perform a common operation; and generating an alert to notify a user of the potential malicious use of the resource management agent based on detection of the anomalous operation.

17. The computer program product of claim 16, wherein detecting the anomalous operation is based at least in part on the identified API request requesting that the resource management system cause the resource management agent to be executed for a temporally first time within the designated period of time or deleted for a temporally first time within the designated period of time.

18. The computer program product of claim 16, wherein detecting the anomalous operation is based at least in part on the identified API request requesting, fora temporally first time within the designated period of time by the designated machine associated with the designated subscription, that the resource management system cause the resource management agent to perform the operation.

19. The computer program product of claim 16, wherein detecting the anomalous operation is based at least in part on the identified API request requesting that the resource management system cause the resource management agent to set settings of the administrator account associated with the machine.

20. The computer program product of claim 16, wherein detecting the anomalous operation is based at least in part on the identified API request requesting that the resource management system cause the resource management agent to exclude the file or the type of file from triggering the alert in the subscription by the malware detection service for a temporally first time within the designated period of time.

* * * * *